(12) United States Patent
Ravindranath et al.

(10) Patent No.: US 11,070,575 B2
(45) Date of Patent: Jul. 20, 2021

(54) VERIFYING ACCURACY OF ML PIPELINES USING THIRD PARTY CO-ORDINATION

(71) Applicant: Cisco Technology, Inc., San Jose, CA (US)

(72) Inventors: Ram Mohan Ravindranath, Bangalore (IN); Prashanth Patil, San Jose, CA (US); Rajesh Indira Viswambharan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 345 days.

(21) Appl. No.: 16/293,937

(22) Filed: Mar. 6, 2019

(65) Prior Publication Data

US 2020/0287919 A1 Sep. 10, 2020

(51) Int. Cl.
*H04L 12/00* (2006.01)
*H04L 29/06* (2006.01)
*G06N 20/00* (2019.01)
*H04L 12/741* (2013.01)
*G06F 16/28* (2019.01)

(52) U.S. Cl.
CPC ........ *H04L 63/1425* (2013.01); *G06F 16/285* (2019.01); *G06N 20/00* (2019.01); *H04L 45/74* (2013.01); *H04L 63/123* (2013.01); *H04L 69/22* (2013.01)

(58) Field of Classification Search
CPC ....... G06N 20/00; H04L 63/145; H04L 67/10; H04L 63/1425; H04L 63/0421; H04L 63/123; H04L 41/16; H04L 43/026; H04L 69/22; H04L 45/74; G06F 16/285

USPC .................... 726/23; 709/201, 203, 220, 223
See application file for complete search history.

(56) References Cited

U.S. PATENT DOCUMENTS

| | | | | |
|---|---|---|---|---|
| 5,289,462 A | * | 2/1994 | Ahmadi | H04L 12/5602 370/232 |
| 6,147,970 A | * | 11/2000 | Troxel | H04L 12/1881 370/235 |
| 7,289,447 B2 | * | 10/2007 | Compton | H04L 47/2441 370/235 |
| 7,742,406 B1 | * | 6/2010 | Muppala | H04L 47/2441 370/230 |
| 9,189,747 B2 | | 11/2015 | Mann et al. | |

(Continued)

OTHER PUBLICATIONS

Gil et al., "P4ML: A Phased Performance-Based Pipeline Planner for Automated Machine Learning," Proceedings of Machine Learning Research, ICML 2018 AutoML Workshop, pp. 1-8.

(Continued)

*Primary Examiner* — Frantz Coby
(74) *Attorney, Agent, or Firm* — Polsinelli PC (57) ABSTRACT

Systems, methods, computer-readable media, and devices are disclosed for verifying traffic classification. At a first node, a classification to a received packet is designated according to a local model. The classification of the packet by the first node is verified by sending packet information describing the packet to a distributed network comprising multiple nodes, where the packet information includes attributes of the packet. The classification of the packet is verified from receiving results from a second node that, based on the attributes, independently classifies the packet. Based on the verified classification, decentralized information for classifying packets is updated.

20 Claims, 7 Drawing Sheets

Designating, at a first node, a classification to a received packet according to a local model.
110

Verifying the classification of the packet by the first node by sending packet information describing the packet to a distributed network comprising multiple nodes, wherein the packet information comprises attributes of the packet.
120

Verifying the classification of the packet from receiving results from a second node that, based on the attributes, independently classifies the packet.
130

Updating decentralized information for classifying packets based on the verified classification.
140

(56) References Cited

U.S. PATENT DOCUMENTS

| | | | |
|---|---|---|---|
| 9,325,627 B2* | 4/2016 | Compton | H04L 47/10 |
| 9,886,670 B2 | 2/2018 | Dirac et al. | |
| 2008/0205403 A1* | 8/2008 | Akyol | H04L 47/10 |
| | | | 370/392 |
| 2009/0190592 A1* | 7/2009 | Hsieh | H04L 45/48 |
| | | | 370/392 |
| 2012/0163165 A1* | 6/2012 | Ra | H04L 45/50 |
| | | | 370/225 |
| 2013/0201996 A1* | 8/2013 | Masputra | H04L 47/6215 |
| | | | 370/412 |
| 2013/0259045 A1* | 10/2013 | Johansson | H04L 45/306 |
| | | | 370/392 |
| 2015/0026794 A1* | 1/2015 | Zuk | H04L 69/22 |
| | | | 726/13 |
| 2015/0195387 A1* | 7/2015 | Snyder, II | H04L 45/7457 |
| | | | 370/392 |
| 2015/0263901 A1* | 9/2015 | Kumar | H04L 45/02 |
| | | | 370/254 |
| 2015/0263945 A1* | 9/2015 | Blessing | H04L 69/14 |
| | | | 370/392 |
| 2017/0048152 A1* | 2/2017 | Kampmann | H04L 47/2441 |
| 2017/0206449 A1 | 7/2017 | Lain | |
| 2018/0167329 A1* | 6/2018 | Srinivasan | H04L 45/745 |
| 2018/0219771 A1* | 8/2018 | Onno | H04L 12/2898 |
| 2020/0259753 A1* | 8/2020 | Ma | G06N 5/003 |

OTHER PUBLICATIONS

Mendels, "Building Reliable Machine Learning Models with Cross-Validation," KDnuggets, Aug. 2018, pp. 1-3.

* cited by examiner

VERIFYING ACCURACY OF ML PIPELINES USING THIRD PARTY CO-ORDINATION

TECHNICAL FIELD

The present disclosure relates generally to malware detection, and specifically in malware detection using machine learning techniques.

BACKGROUND

Cloud providers and Enterprises employ signature-based detection in security applications for the classification of traffic, detecting patterns, identifying malware, etc. Signature-based detection is effective at identifying known threats. Each signature is a string of code or pattern of actions that corresponds to a known attack or malicious code. Network traffic and files can be checked against a database of such signatures to see if any known threats are present; if they are, an alert is issued and mitigation processes begin. However, signature-based detection suffers from limitations in that it cannot detect malicious code or events that don't have previously known signatures. As the threat landscape increases in size as well as complexity, this makes it harder to keep lists of such signatures up to date. New detection techniques are needed.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, computer-readable media, and devices are disclosed for verifying traffic classification. At a first node, a classification is designated to a received packet according to a local model. The classification of the packet by the first node is verified by sending packet information describing the packet to a distributed network comprising multiple nodes, where the packet information includes attributes of the packet. The classification of the packet is verified from receiving results from a second node that, based on the attributes, independently classifies the packet. Based on the verified classification, decentralized information for classifying packets is updated.

Example Embodiments

The disclosed technology addresses the need in the art for deploying Machine Learning (ML) pipelines for security applications. Cloud providers and Enterprises can deploy Machine Learning pipelines for a variety of reasons. For example, these providers can use ML in security applications for the classification of traffic, learning new patterns, detecting malware, etc.

Many enterprises are moving away from traditional signature based analysis. For example, enterprises can use one or many ML variants to help classify traffic. Enterprises can, for example, go for a cloud offering where all traffic or selective traffic is redirected through a Security as a Service (SecaaS) cloud, or have their own private cloud, or have in-house ML pipelines in their data centers. However, problems that can plague these ML pipelines are inaccuracies in traffic classification and/or detection of malware. ML pipeline inaccuracies are increasingly problematic as enterprises and cloud providers need to offer security services more quickly, efficiently, and over increasingly large amounts of traffic.

The example embodiments described herein can solve problems related to inaccuracies in a ML pipeline by coordinating with third party providers that have other ML pipelines that can be cross referenced. These third party providers can be semi-trusted. For example, some embodiments can identify traffic that may not be accurately analyzed by current ML models on a specific node within the enterprise's network. The example embodiments can identify a new or uncertain pattern within the traffic. The identification can then cause a new block to be created on a block chain including a group of semi-trusted nodes. In some embodiments, the new block can then be verified by other nodes on the block chain if their classification of the traffic is accurate. Once a consensus is reached, the new root block can be appended to the block chain as a confirmed block (and available later for lookups of traffic that displays similar features).

An issue faced by Enterprise security admins and SecaaS providers can be the evaluation of the ML pipeline to eliminate false positives. Evaluating an ML pipeline can include approaches that include techniques such as inspecting evaluation results (for example, by tools, automation pipelines, manually, etc.); using different data sets that have prior results to look at accuracy; or cross-verifying against other models (which can, for example, be done by training both models). This requires a pipeline that can access feed data to multiple pipelines which is not practical if models are operated by different providers.

The accuracy of a ML pipeline can be enhanced by coordinating with third party providers that have similar pipelines and expertise. For example, the coordination can be facilitated by using a ML evaluation block chain network or a similar consortium. While numerous example embodiments are disclosed that use block chains to illustrate mechanisms for co-ordination, any technique by which multiple parties can trust each other can be used here—block chains, for example, happen to be an effective candidate for such coordination among semi-trusted evaluation sources. Reputation scores of an ML pipeline can also be implemented to weigh in on classification results.

In example embodiments, a cloud provider or Enterprise can include multiple ML pipelines for various services. The provider/enterprise may want to ensure that the ML pipeline is functioning as desired by offering fair classification (i.e., not penalizing legitimate traffic). In some embodiments, the ML pipelines can be developed initially by supervised training (which can be error prone) and then later switched to unsupervised mode. In unsupervised mode, for example, the ML pipeline can look at each new flow and classify flows using existing trained data if flow characteristics match existing data; and, if a new pattern is found, feed the pattern to a training engine which can use the pattern to classify the flow to a closest and/or probable flow type. As mentioned earlier, ML pipelines can be prone to errors and false positives during its early life. For critical pipelines, for example ML pipelines for Security services/Administrative services, it is important the errors are few because the cost of errors can be very high (resulting in loss of revenue, etc.).

Figure 1:
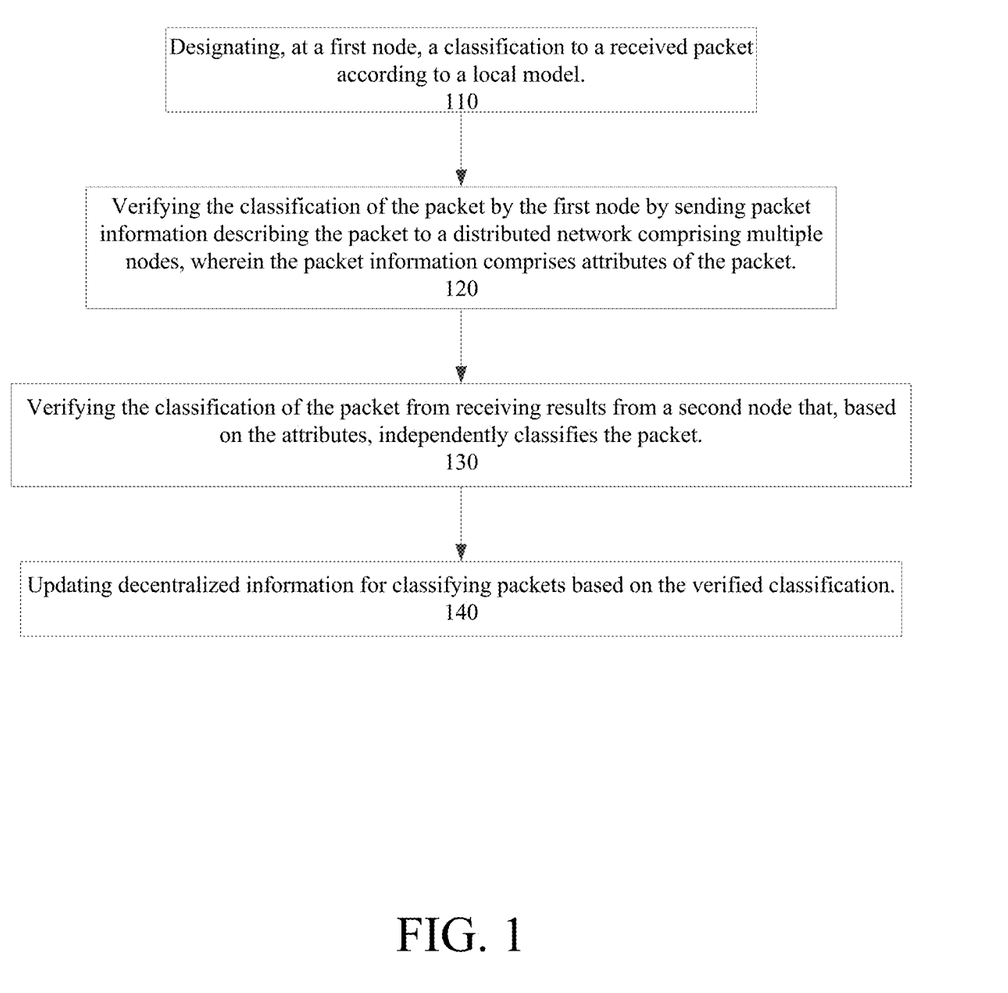
FIG. 1 is a flowchart representation of using third party recommendations to evaluate and/or improve ML classification, according to various example embodiments.

FIG. 1, for example, shows a system diagram of using third party recommendations to evaluate and/or improve ML classification, according to several embodiments. In some embodiments, an initial classification can be designated (e.g., at a first node) to a received packet according to a local model (step 110). The initial classification, however, can be uncertain, based on the received packet displaying one or more patterns the local model is unable to classify to a desired level of certainty. The classification of the packet by the first node can then be verified, for example, by another node (step 120) in order to accurately classify the packet. For example, packet information describing the packet can be sent to a distributed network comprising multiple nodes, one or more of the other nodes employing their own, independent ML classification to double-check the initial classification. The packet information can include one or more attributes of the packet. In some embodiments, the first node may send the entire packet (or even the complete capture of the flow) to the distributed network so as to allow other nodes to analyze. In cases where privacy is desired, the first node can anonymize the data (by removing any Privately identifiable Information [PII] data) and send it along with results from the first node's ML engine.

For example, the classification of the packet can be verified by receiving results from another node or a subset of nodes of the distributed network, such as through a verification service. The another node or subset of nodes may classify the packet independently from the original, first node. For example, the another node or subset of nodes can determine and/or assign a classification of the packet according to one or more models specific to each node.

In example embodiments, where the verification service employs a subset of nodes to verify packet classification, the classification among the subset of nodes can be cross-verified by matching the results from each node of the subset of nodes. Based on similar results from a certain number of nodes of the subset (e.g., a threshold number of nodes, for example), the classification of the packet can be confirmed. This can increase the accuracy of packet, such that more threats are identified and/or there are fewer false positives when classifying traffic.

Figure 2:
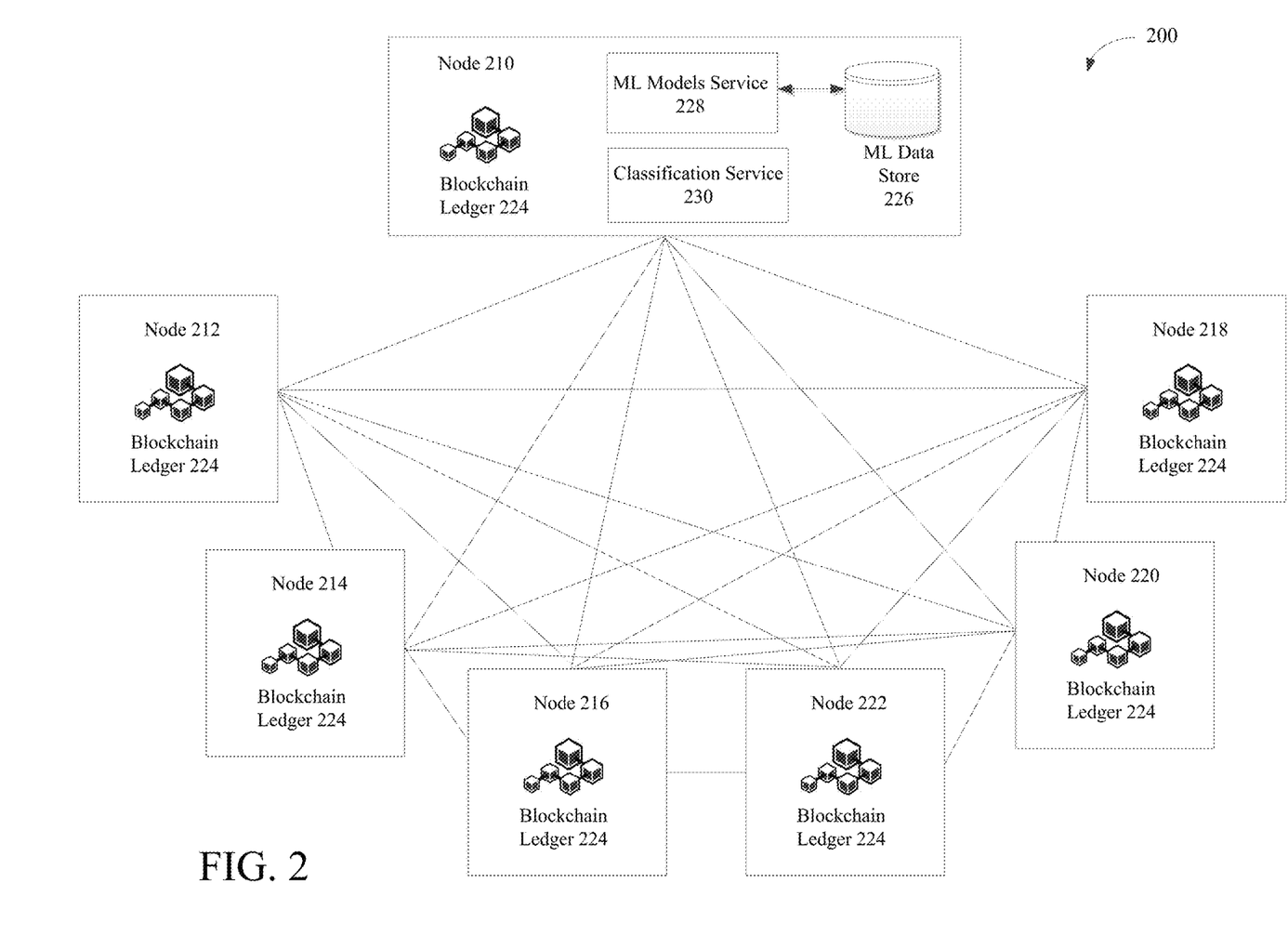
FIG. 2 shows an example schematic diagram of a block chain environment using third party recommendations to evaluate and/or improve ML classification, according to various example embodiments.

FIG. 2 shows an example schematic diagram of a block chain environment using third party recommendations to evaluate and/or improve ML classification, according to various example embodiments. System 200 shows an initial classification of new traffic patterns and subsequent feeding to a block chain. System 200 shows an example schematic diagram of a network that includes various nodes that can be configured to maintain a block chain. Node 210 is one of many nodes within the network. Each node within the network can be one or more partners, experts, vendors, and/or other third parties that can determine and/or classify packets of traffic. In other words, system 200 can include any number of parties that have been enabled as nodes on system 200. In the shown example embodiment, system 200 includes node 212, node 214, node 216, node 218, node 220, and node 222. Each node on system 200—including all partners, experts, vendors, or other third parties—can include a copy of block chain ledger 224 that has been duplicated across all the nodes.

In some embodiments, system 200 can be a SecaaS auditing block chain network. For example, member nodes in the network could include security vendors, security experts from various organizations, SecaaS providers that deploy ML pipelines, blackHat hackers, etc. Any enterprise that can deploy ML pipelines for security analysis or is interested in such pipelines can join the block chain network. In some embodiments, described in more detail in FIG. 6, membership to the block chain could be open or permissioned based on a consortium. In some embodiments, the scope of the membership access can be based on the intent of the block chain network.

Block chain ledger 224 can be any linked ledger system. In the embodiment shown, block chain ledger 224 is a ledger system within a distributed block chain, where a continuously growing list of records, called blocks, is linked to one or more previous blocks. Blocks can be continuously updated as block chain ledger 224 is modified with subsequent classifications, data, updates, etc. from the nodes within system 200. For example, a block can receive packet information (which can include a classification of the packet and/or other attributes of the packet) from node 212. In some embodiments, node 210 may send the entire packet (or even the complete capture of the flow) to system 200 so as to allow the other nodes (e.g., nodes 212, 214, 216, 218, 220, and/or 222) to analyze. In cases where privacy is desired, node 210 can anonymize the packet data (by removing any Privately identifiable Information [PII] data) and send it along with results from the node's 210's ML engine (e.g., ML models service 228).

In some embodiments, the block can be labelled as "pending" or some indication that the block needs verification. A later block can record that the block has been verified by one or more other nodes within system 200. In some embodiments, the verification of the classification can be associated with the packet attributes, so that node 210 (and any other node on system 200) can include and/or modify the classification within their ML models, removing the need to verify a subsequent time. This record can, for example, extend indefinitely in order to further refine the ML models of all the parties with nodes on system 200.

In the embodiment shown, system 200 can be, in part or in whole, a public distributed block chain. Alternatively, in some embodiments system 200 may be used and run by one organization or entity, which can manage security and control authorization for each node on the network in addition to managing business rules and policies controlled by various smart contracts. For example, the organization may grant a first node access to only a portion of some data on the block chain, so that information from another node (who may be a competitor of the first node) is kept private from the first node. The organization may even keep some information private from all network nodes. However, one of skill in the art will understand that any architecture that supports a chain of custody of individual components can be used to the same effect.

Each node can include functionality to read and/or access block chain ledger 224, create events that include classifications, record data and/or attributes of the packet, updates, etc. In some embodiments, node 210 can include classification service 230, which can classify received packets into certain types, such as malware, non-malicious, etc. traffic. Classification service 230 can be based on, for example, packet attributes of the received packets that are analyzed according to one or more models included within ML Models Service 228. In some embodiments, Machine Learning (ML) data store 226 can store data and/or attributes that can train or refine ML models service 228. The processes of classification service 230 and ML models service 228 can be automated on demand in a real- or near real-time basis. The classification of the packet can then be verified from receiving results from at least one other node that, based on the attributes, independently classifies the packet (step 130).

Figure 3:
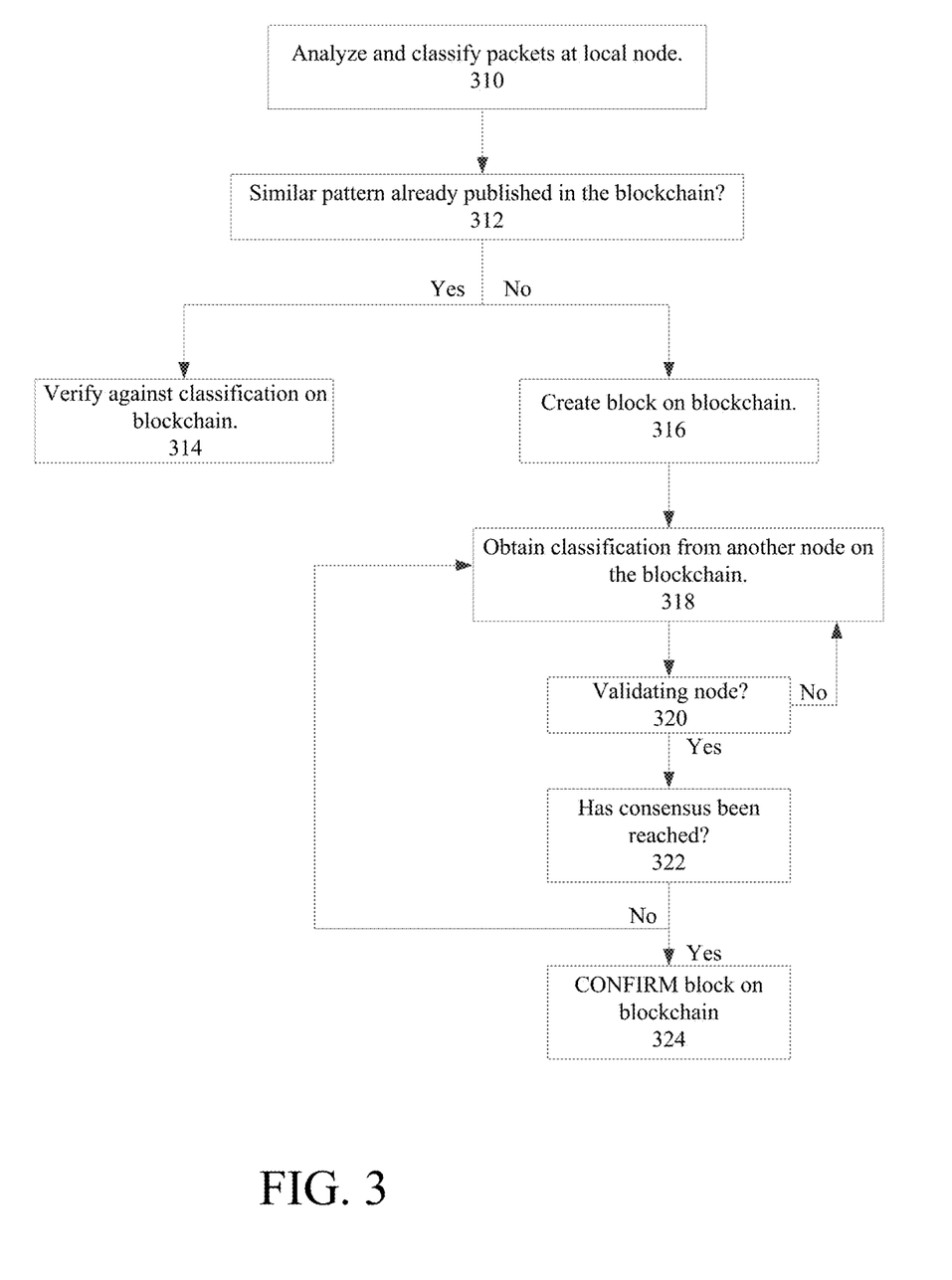
FIG. 3 is a flowchart representation of membership and consensus mechanisms in evaluating and/or improving ML classification, according to various example embodiments.

FIG. 3 is a flowchart representation of membership and consensus mechanisms in evaluating and/or improving ML classification, according to various example embodiments. In some embodiments, packets received by a node are analyzed and classified into specific types of traffic (e.g., malware vs. non-malware traffic) locally to the node (step 310). For example, packets are initially classified (e.g., by, for example, classification service 230) into types of classifications by ML models (e.g., ML service 228) on node 210. In some embodiments, if the ML models can classify the traffic within a threshold confidence level or range (e.g., above a 95% confidence level or between 89-100% confident, for example), then node 210 can assign the classification without need for verification and can end the method. However, all other types of traffic can be verified by the block chain.

Figure 4:
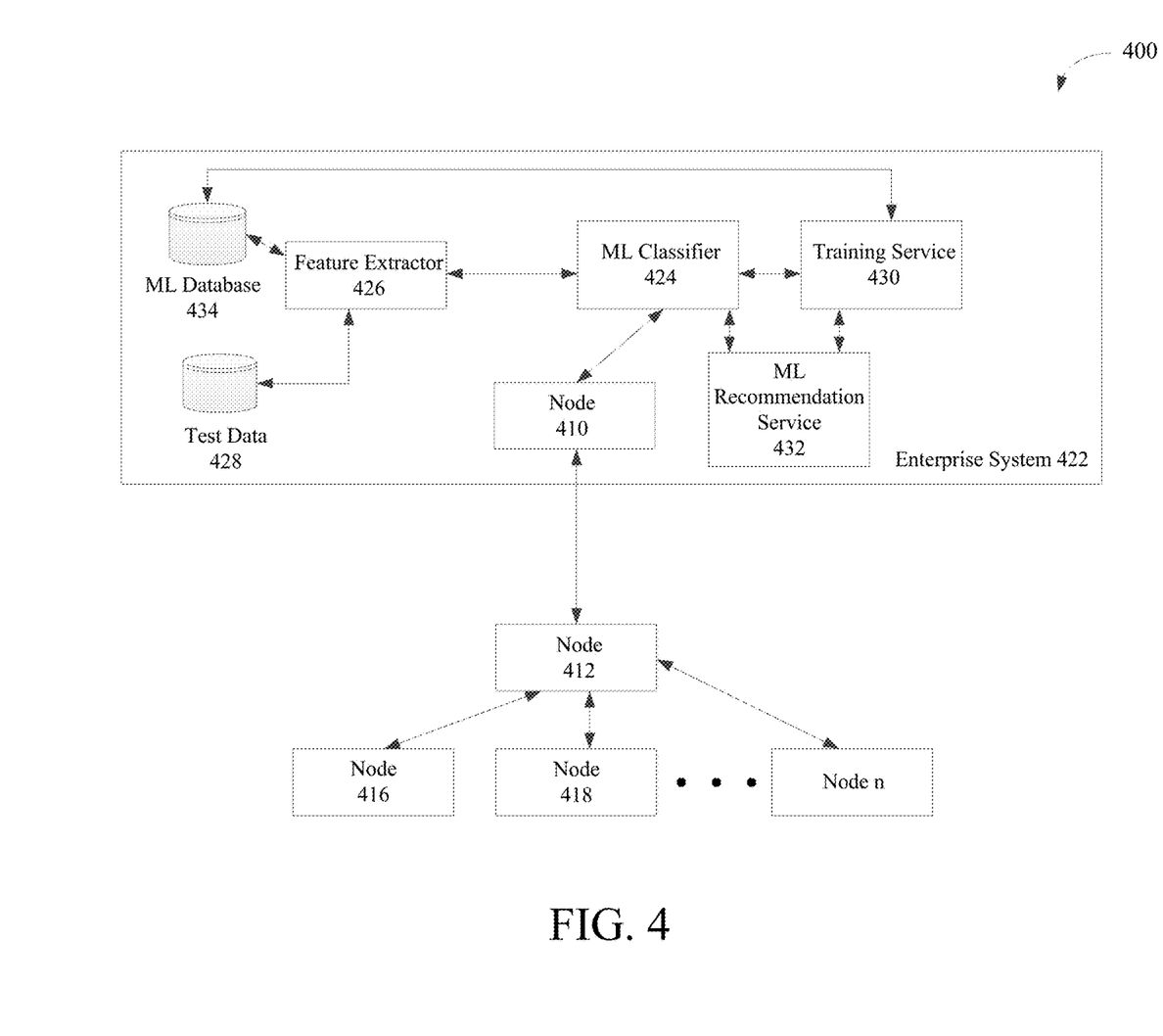
FIG. 4 shows an example schematic diagram of a block chain environment using third party recommendations to evaluate and/or improve ML classification, according to various example embodiments.

FIG. 4, for example, shows an example schematic diagram of a block chain environment using third party recommendations to evaluate and/or improve ML classification, according to various example embodiments. In this embodiment, system 400 includes node 412 in connection with multiple nodes such as node 416, node 418, . . . node n. Enterprise system 422 can include egress node 410 in communication with ingress node 412 and with various services (e.g., ML classifier service 424, feature extractor service 426, training service 430, etc.) within enterprise system 422, although one of ordinary skill in the art can make the various services local to node 410. ML classifier service 424 can receive packets associated with node 410 and can extract attributes via feature extractor service 426. Feature extractor service 426 can isolate, detect, and/or determine attributes that correspond to features that indicate a certain type of traffic. For example, certain features or attributes within the packets may indicate the packets are malware, spyware, etc. and should be classified as such. Malware, for example, can be detected using various techniques, including but not limited to: detecting files that match known malware; comparing behaviors and characteristics against known malware (e.g., looking for variants of malware "families"); sandboxing suspected malware based on suspicious behavior or file structures; techniques that search for code in a program that is trying to enable unwanted or unauthorized access to various file systems or secure locations in the machine, etc.

Feature extractor 426 may include test data 428 that was used to initially train ML models. For example, test data 428 can be compiled data of example malware, spyware, non-malicious traffic, etc. that was used to generate the ML models used by ML classifier 424. In some embodiments, the ML models can be further refined or modified to more accurately classify packets. For example, ML database 434 can compile data on subsequent and current traffic, so that the ML models can be continuously trained while they operate to classify packets. This new data can be inputs to a training service 430 that modifies the ML models used by ML classifier 424 based on the data within ML database 434.

When a new pattern is discovered by ML classifier service 424 (e.g. a new malware pattern) and/or the ML classifier service 424 cannot assign a classification within an acceptable threshold confidence range, a new root block can be created on the block chain. The node can then look up the pattern in the block chain network to verify if a similar pattern was already published in the block chain network (i.e., a standard discovery process to verify against duplicates) (step 312). For example, attributes of the packet can be associated with a threat pattern extracted from a portion of the packet and/or traffic that can then be used by ML classifier service 424 to classify the packet. The threat pattern can be, for example, extracted based on statistically based patterns describing malware or other types of traffic that can be compared with ML models.

If the lookup in the block chain network finds that a similar pattern has been published to the block chain network, the classification associated with that pattern can be assigned to the traffic (step 314). If the lookup does not find a similar pattern (for example the pattern is new, not recognized, or cannot be defined within a threshold confidence), then a root block can be created on the block chain (step 316).

In some embodiments, the root block can carry details of the threat pattern, threat parameters, etc. that are observed (these details can be stored in ML database 434 as well). The root block can also include the associated classification made by the local ML models. In some embodiments, the root block can carry information on the network pattern that the ML classifier service 424 was sampled against, the means of generating such patterns, example packet captures, etc. For example, the root block can contain threat related tags. Tags can be a means for nodes to get notifications for interesting root blocks. The node can also publish the entire traffic sample accessible in a data store accessible to node on system 200, such as an external storage, etc. The root block may contain portions or the entire packet (or even the complete capture of flow), which can allow other nodes on the block chain to analyze. In cases where privacy is desired, node 410 can anonymize the data (by removing any Privately identifiable Information [PII] data) and send it along with results from node 410's ML engine (e.g., ML classifier service 424).

In some embodiments, once the root block is committed, any other member in the network can pick up details from the root block to subject their own ML engines against the traffic feeds to obtain separate, independently determined classification results. Each participating node can then add blocks containing classification results to the block chain (step 318). For example, the block chain can receive results from at least a second node that includes receiving the second node's independent classification of the packet. The second node can use the attributes included within the root block to analyze the packet, and based on ML models applied at the second node, a unique solution (e.g., independently determined classification of the packet) from the second node's local model can be provided to the block chain. The second node can append updated information to a ledger on the block chain, including but not limited to the verified classification, attributes of the packet, etc. Once validated, the root block can be updated based on the verified classification (as well as any attributes or other data associated with the verified classification) (step 140).

Figure 5:
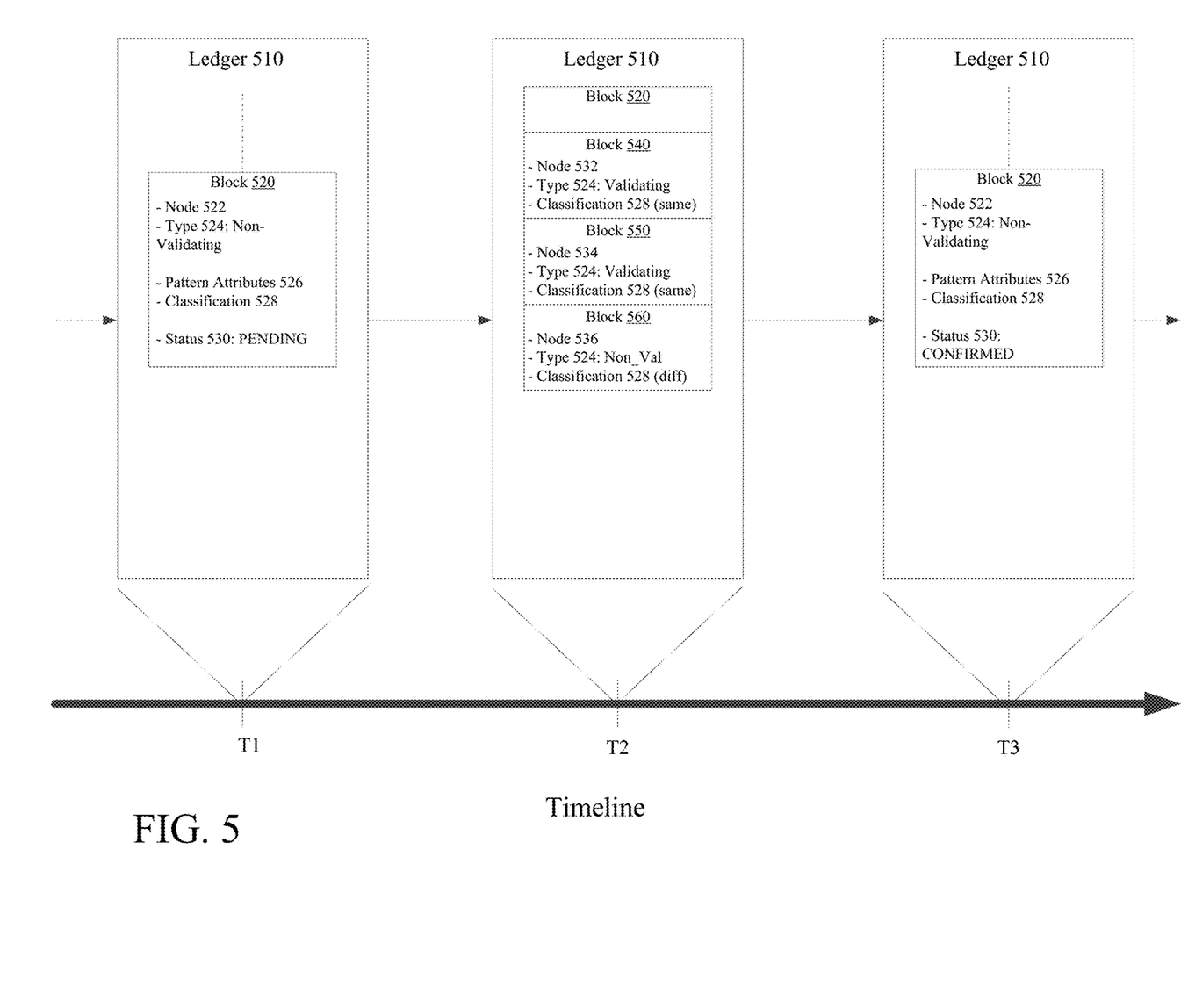
FIG. 5 shows an example block chain implementation, according to various example embodiments.

FIG. 5 shows an example block chain implementation, according to various example embodiments. For example, FIG. 5 shows a block diagram of an example implementation of a block chain showing block generation from FIG. 3's and FIG. 6's verification and consensus processes. Block chain (ledger 510) is illustrated at times T1, T2, and T3, which are separated by time intervals. For example, ledger 510 includes a root block (block 520) at time T1, with block 540, block 550, and block 560 appended to ledger 510 at T2, and a modified block 520 on ledger 510 at T3. Each block can be appended at any time there is a step or event in the verification process.

Each block can also contain multiple events and/or data from multiple nodes on the block chain. For example, block 520 can be a root block that is appended to ledger 510 when a lookup in the block chain does not find a similar pattern to the pattern within the packet (e.g., the pattern is new, not recognized, or cannot be defined within a threshold confidence). Block 520 can include information related to the packet, including but not limited to: the node 522 that received the packet and forwarded it to be verified, node 522's initial classification 528 (e.g., classified as malware, for example, with a low confidence of 65%), and a status 530 of "PENDING" to indicate that the classification 528 has not been verified by other nodes within the block chain. In some embodiments, block 510 can include relevant portions of the packet, the entire packet, or the entire flow of the packet that, in turn, can be used by other nodes within the block chain to analyze the packet independently.

In some embodiments, block 520 can include pattern attributes 526 of the packet. For example, the pattern attributes 526 can be what the ML models of node 522 used to determine the initial classification 528. In some embodiments pattern attributes 526 can be packet attributes extracted by feature extractor 426 and/or classification service 230.

In order to verify classification 528, other nodes within the block chain can pick up details from block 520 and apply their own ML engines to the packet data to obtain separate, independently determined classification results. For example, at time T2, block 540 includes classification 528 determined by node 532. Similarly, block 550 includes classification 528 from node 534's ML models, and block 560 includes classification 528 determined by node 536. In this embodiment, for example, classifications 528 are the same for node 532 and node 534 (e.g., the packet is malware), but classification 528 is different for node 536 (e.g., the packet does not include malware).

In some embodiments, the classification must be verified by at least one validating node. For example, once a classification for a new pattern is obtained from another node on the block chain, the method can determine whether the other node is a validating node (step 320). Thus, blocks on the block chain can indicate a node type of the node. For example, in block 520, node 522 has a node type 524 of "Non-validating," meaning that node 522 cannot verify a classification. Similarly, node 536 has a node type 524 that designates it as a non-validating node. This means that the classification from that node will not affect the final classification adopted by ledger 510.

Therefore, even if the new pattern is classified by another node, if the node is not a validating node, or if a threshold number of validating nodes have not agreed on a classification, then the method continues by requesting or waiting for another node that is a validating node to classify the new pattern. In some embodiments, this can be characterized as a determination about whether consensus has been reached (step 322). If consensus has been reached, then block 520 is confirmed on ledger 510 (step 324). If not, the method continues by requesting or waiting for other validating nodes until consensus is reached.

As an example of consensus, at time T3, two validating type nodes (e.g., node 532 and node 534) have classified the packet. Since two validating nodes are enough to, in this example embodiment, reach consensus, then block 520 will change status 530 to "CONFIRMED". In some embodiments, once status 530 is confirmed, then all nodes can have the ability to access classification 528 when performing lookups for similar pattern attributes 526, since all the nodes have copies of ledger 510. Moreover, each node can add to or modify their individual ML models to encompass this verified classification (e.g., ML models service 228 can copy pattern attributes 526 and verified classification 528 to ML data store 226).

Figure 6:
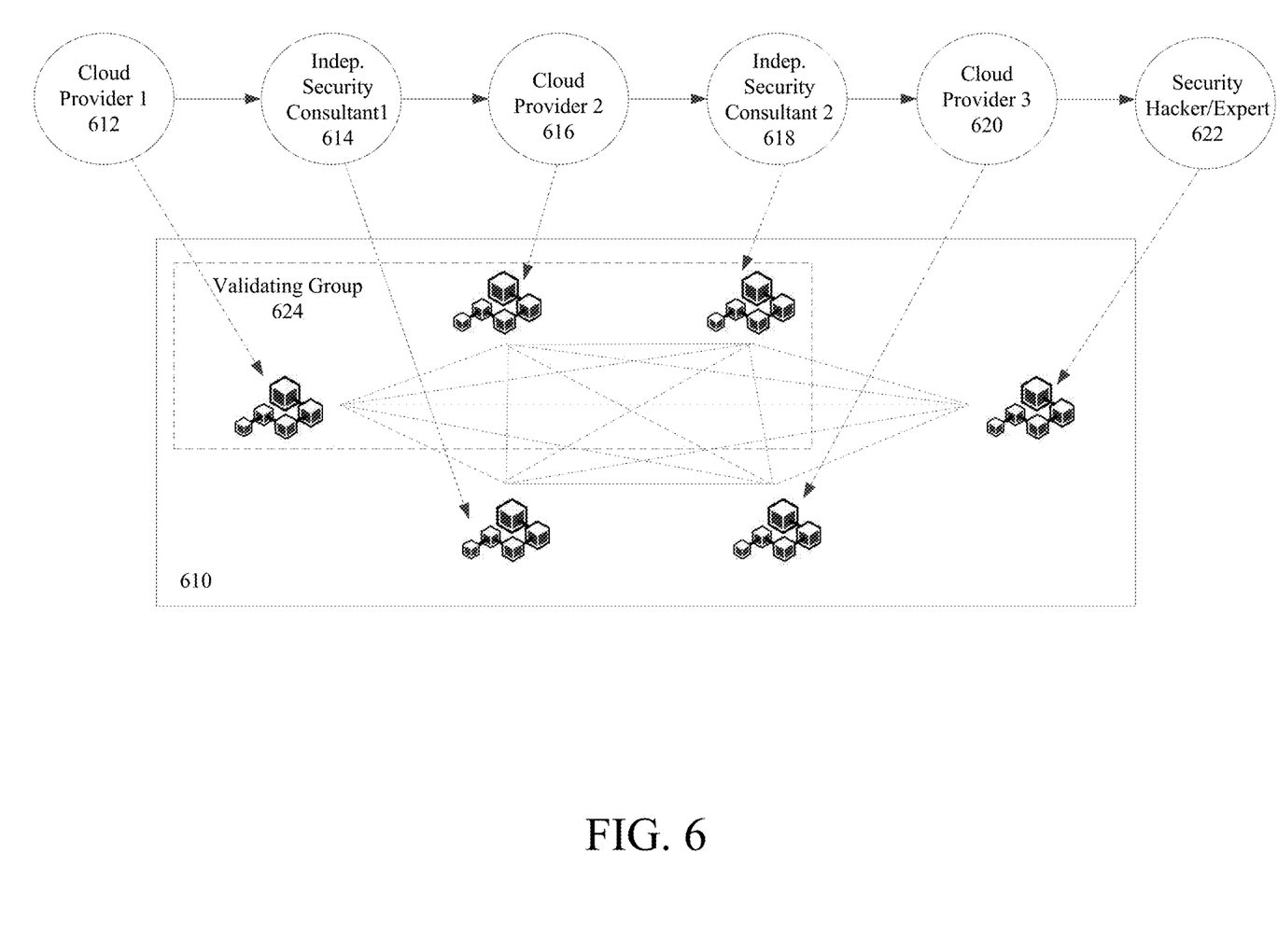
FIG. 6 shows an example schematic diagram of a block chain environment using membership and consensus mechanisms in evaluating and/or improving ML classification, according to various example embodiments.

FIG. 6 shows an example schematic diagram of a block chain environment using membership and consensus mechanisms in evaluating and/or improving ML classification, according to various example embodiments. As described above, the root block can remain in a "PENDING" state until validating nodes in the block chain network confirm that the classification is accurate based on a consensus service (e.g., based on Practical Byzantine Fault Tolerance PBFT or other similar techniques). The root block can move to a "CONFIRMED" state when there is consensus that the classification results are accurate or if there was consensus on the observations made.

The classification for a new or uncertainly classified pattern in a packet can be verified by at least one validating node. In some embodiments, such as that shown in FIG. 6, all the nodes in block chain 610 have a trust relationship in such a way that no single party (node) can be a bad actor and get away with it. Such a trust relationship can be achieved by any distributed network or a similar technology (e.g., block chain) that provides integrity, confidentiality, mutual trust and a way to ensure that data cannot be modified by any member in the network without other nodes being aware of it.

For example, the validating node can be designated as such based on a record of accurate classifications. In some embodiments this record can be represented by a reputation score, where the more accurate the classifications, the higher the reputation score. The reputation score can be based on other nodes within the block chain agreeing to a high degree with the node. Therefore, a validating node can be designated when it has a reputation score above a threshold value. Conversely, a node within the distributed network having a reputation score below a threshold value cannot verify the classification, and can be designated as a non-validating node (but can still perform lookups within the block chain).

In FIG. 6, block chain 610 can have both validating peers and non-validating peers represented as validated nodes and non-validated nodes, respectively. The peers can be nodes corresponding to any entity that wishes to participate in verifying their classifications for new or uncertain packets, such as providers, consultants, experts, etc. For example, the peers included in block chain 610 are cloud provider 1 612, independent security consultant 1 614, cloud provider 2 616, independent security consultant 2 618, cloud provider 3 620, and hacker/expert 622. Only validating nodes can confirm the addition of a block that can be used for subsequent lookups. Non-validating nodes, for example, can have only read access while validating nodes can have both read and write access. In some embodiments, the addition of a block can be based on a threshold number of validating nodes agreeing on a classification for a packet.

For example, consensus protocols and services like Practical Byzantine Fault Tolerance (PBFT) protocol (or similar) can be used to commit a block into the block chain network. If PBFT is used, for example, then in a block chain network of (N) nodes a minimum of 2*f+1 validating nodes must reach consensus to commit a block (where f=(N−1)/3). The network can withstand (f) number of Byzantine nodes.

Block chain 610 can include a validating group 624 within the nodes. For example, validating group 624 includes cloud provider 1 612, cloud provider 2 616, and independent security consultant 2 618. The role of a peer can be determined based on its reputation score. To start with, all vendor ML engines on each peer can have equal score, and over a period of time when the same test data is classified across various vendors' ML engines and then cross-verified by security experts, the reputation scores can be determined and hardened.

For example, independent security researchers, security experts, and security practitioners can join the block chain network as non-validating peers and can be promoted to validating peers based on their activities in block chain 610. When a vendor that's a peer adds a new block with classification results, validating peers in the block chain network can validate and verify information in the new block and confirm if the additional information in the new block is accurate. Each time a vendor's block is confirmed and added to the chain, the reputation score of the vendor can increase. If the validating nodes within validating group 624 confirm that the additional information in the new block is not accurate or rejected for other reasons, the reputation score can be lowered appropriately.

In some embodiments, if the reputation score of the vendor exceeds a certain "high water mark" (e.g., threshold value), then the vendor will be promoted as a validating peer. Conversely, if the reputation score of the vendor falls below a certain "low water mark" then the vendor will be demoted as a non-validating peer.

In this embodiment, for example, cloud provider 1 612 has received packet information and provided a classification of the packet to block chain 610. Subsequently, independent security consultant 1 614 submitted its own independently determined classification, then cloud provider 2 616 submitted its own independently determined classification, then independent security consultant 2 618 submitted its own independently determined classification, then cloud provider 3 620 submitted its own independently determined classification, and then security hacker/expert 622 submitted its own independently determined classification. Block chain 610 can have access to all these classifications for the packet. Consensus, however, depends only on the classifications submitted by cloud provider 1 612, cloud provider 2 616, and independent security consultant 2 618. Consensus may stipulate that all or some minimum portion of validating group 624 agree on the classification. For example, if all three agree on the classification, then the new root block can be confirmed and added to block chain 610 indefinitely.

Using the techniques and example embodiments described above, Enterprise/SecaaS ML pipelines over a period of time will have reduced false positives. The Enterprises ML pipeline can have an automated feedback line that will take the feedback from this BC network and relearn and/or correct its classification part.

Block Chains can be used to ensure that the various parties involved in audit in the network trust each other. Other means of trusting (like peer to peer) may also be used instead of a block chain here. And while SecaaS Service ML pipeline has been used as an example, these techniques can be applied to any other types of pipelines as well.

Moreover, even though example embodiments have described multiple providers (Enterprises/Cloud providers) that share their data to help each other's ML pipelines improve their fairness, the unique selling points of each provider will still be intact. The way each provider's solution uses ML pipelines (e.g., integration with the rest of their components, actions they take, etc.) still remains unique and hence their overall solutions are still unique. The idea here helps reduce false positives of the ML pipelines and thereby the applications and/or actions built on top of the individual ML pipelines can function better and more accurately.

Figure 7:
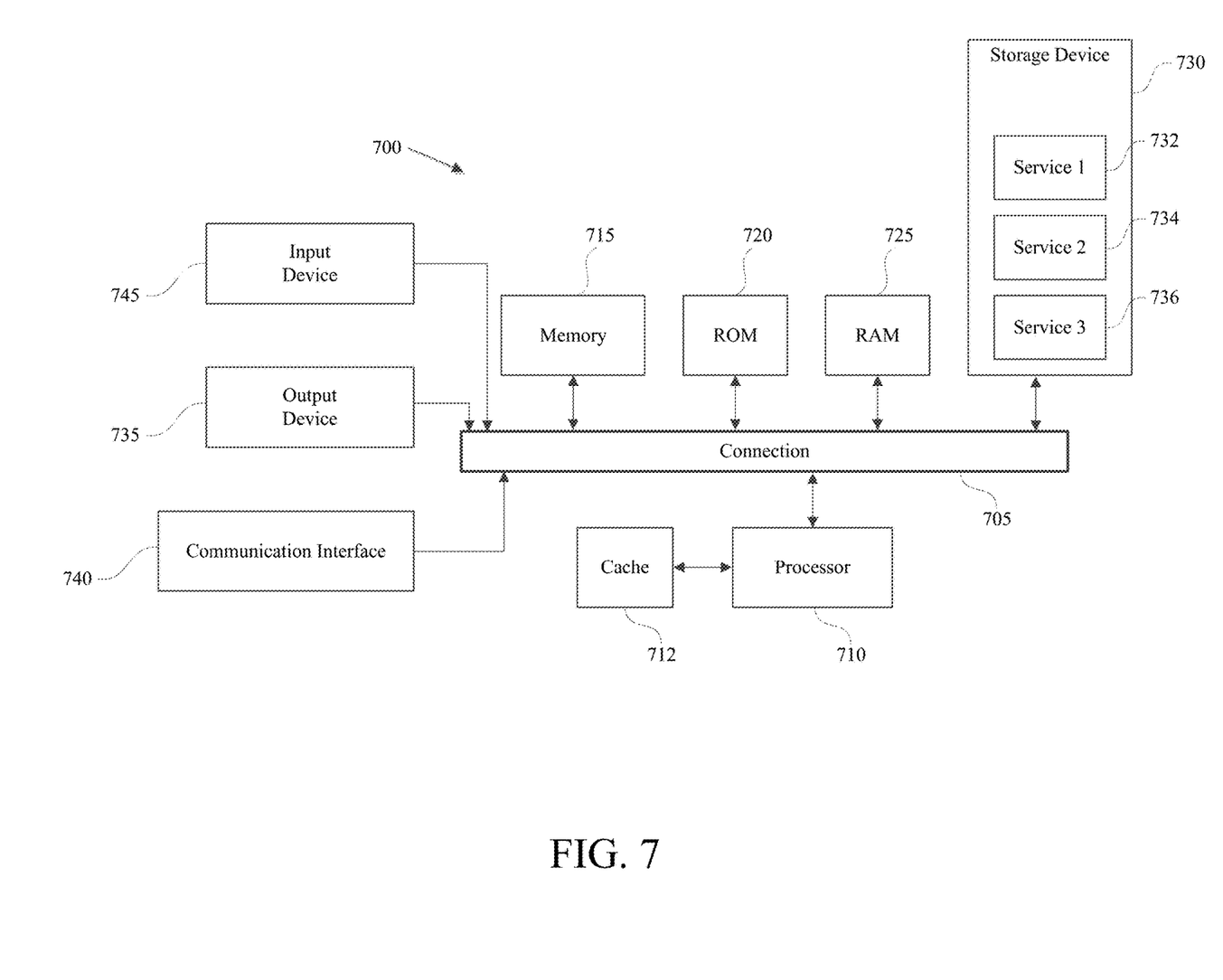
FIG. 7 shows an example of a system for implementing certain aspects of the present technology.

FIG. 7 shows an example of computing system 700 usable in devices within FIGS. 2, 4, and 6 in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for verifying traffic classification comprising:
designating, at a first node, a classification to a received packet according to a local model; and
verifying the classification of the packet by the first node by:
sending packet information describing the packet to a distributed network comprising multiple nodes, wherein the packet information comprises attributes of the packet;
verifying the classification of the packet from receiving results from a second node that, based on the attributes, independently classifies the packet; and
updating decentralized information for classifying packets based on the verified traffic classification.

2. The method of claim 1, wherein verifying the classification of the packet further comprises:
receiving results from a subset of nodes of the distributed network classifying the packet, the classification according to models specific to each node;
cross-verifying the classification among the subset of nodes by matching the results; and
based on a same result from a threshold number of nodes of the subset of the nodes, confirming the classification of the packet.

3. The method of claim 1, further comprising appending the updated decentralized information to a ledger on the distributed network, wherein the updated decentralized information comprises the verified traffic classification and the attributes of the packet.

4. The method of claim 1, wherein the attributes of the packet are associated with a threat pattern extracted from a portion of traffic, the threat pattern extracted based on statistically based patterns describing malware.

5. The method of claim 1, wherein the classification is verified by at least one validating node, the at least one validating node having a reputation score above a threshold value.

6. The method of claim 1, wherein a node within the distributed network having a reputation score below a threshold value cannot verify the classification, and wherein the node having the reputation score below the threshold is restricted from modifying the decentralized information.

7. The method of claim 1, wherein receiving results from a second node comprises receiving an independent classification of the packet, using the attributes, based on a second model providing a unique solution from the local model.

8. A system for verifying traffic classification comprising:
a server to verify traffic classification within a network, the server to:
designate, at a first node, a classification to a received packet according to a local model; and
verify the classification of the packet by the first node by:
sending packet information describing the packet to a distributed network comprising multiple nodes, wherein the packet information comprises attributes of the packet;
verifying the classification of the packet from receiving results from a second node that, based on the attributes, independently classifies the packet; and
updating decentralized information for classifying packets based on the verified traffic classification.

9. The system of claim 8, wherein verifying the classification of the packet further comprises the server to:
receive results from a subset of nodes of the distributed network classifying the packet, the classification according to models specific to each node;
cross-verify the classification among the subset of nodes by matching the results; and
based on a same result from a threshold number of nodes of the subset of the nodes, confirm the classification of the packet.

10. The system of claim 8, the server further to:
append the updated decentralized information to a ledger on the distributed network, wherein the updated decentralized information comprises the verified traffic classification and the attributes of the packet.

11. The system of claim 8, wherein the attributes of the packet are associated with a threat pattern extracted from a portion of traffic, the threat pattern extracted based on statistically based patterns describing malware.

12. The system of claim 8, wherein the classification is verified by at least one validating node, the at least one validating node having a reputation score above a threshold value.

13. The system of claim 8, wherein a node within the distributed network having a reputation score below a threshold value cannot verify the classification, and wherein the node having the reputation score below the threshold is restricted from modifying the decentralized information.

14. The system of claim 8, wherein receiving results from a second node comprises receiving an independent classification of the packet, using the attributes, based on a second model providing a unique solution from the local model.

15. A non-transitory computer-readable medium comprising instructions stored thereon, the instructions for verifying traffic classification and executable by one or more processors of a computing system to cause the computing system to:
designate, at a first node, a classification to a received packet according to a local model; and
verify the classification of the packet by the first node by:
sending packet information describing the packet to a distributed network comprising multiple nodes, wherein the packet information comprises attributes of the packet;
verifying the classification of the packet from receiving results from a second node that, based on the attributes, independently classifies the packet; and
updating decentralized information for classifying packets based on the verified traffic classification.

16. The non-transitory computer-readable medium of claim 15, wherein verifying the classification of the packet further comprises instructions further causing the computing system to:
receive results from a subset of nodes of the distributed network classifying the packet, the classification according to models specific to each node;
cross-verify the classification among the subset of nodes by matching the results; and
based on a same result from a threshold number of nodes of the subset of the nodes, confirm the classification of the packet.

17. The non-transitory computer-readable medium of claim 15, the instructions further causing the computing system to:
append the updated decentralized information to a ledger on the distributed network, wherein the updated decentralized information comprises the verified traffic classification and the attributes of the packet.

18. The non-transitory computer-readable medium of claim 15, wherein the attributes of the packet are associated with a threat pattern extracted from a portion of traffic, the threat pattern extracted based on statistically based patterns describing malware.

19. The non-transitory computer-readable medium of claim 15, wherein the classification is verified by at least one validating node, the at least one validating node having a reputation score above a threshold value.

20. The non-transitory computer-readable medium of claim 15, wherein a node within the distributed network having a reputation score below a threshold value cannot verify the classification, and wherein the node having the reputation score below the threshold is restricted from modifying the decentralized information.

* * * * *